April 5, 1932.  L. D. KAY  1,852,615

TRUCK WHEEL

Filed Aug. 24, 1926

Inventor
Lloyd D. Kay
By Lyon & Lyon
Attorneys

Patented Apr. 5, 1932

1,852,615

UNITED STATES PATENT OFFICE

LLOYD D. KAY, OF LOS ANGELES, CALIFORNIA, ASSIGNOR TO KAY-BRUNNER STEEL PRODUCTS INC., A CORPORATION

TRUCK WHEEL

Application filed August 24, 1926. Serial No. 131,150.

This invention relates to truck wheels, particularly of the type illustrated in my Patent No. 1,640,338, granted August 23, 1927. These truck wheels are intended to be constructed of cast metal and preferably of cast steel. They are intended to carry dual tires. By reason of the large size of the tires used on such wheels, the actual diameter of the wheel body has become much reduced, and wheels of more or less solid or disc form have come into use. One of the difficulties with this type of wheel is that there is no provision for circulation of air into the space between the tires nor into the space surrounding the brake drums on the inner side of the wheels.

One of the objects of the present invention is to provide a construction for the wheel which will facilitate the application of the inboard and outboard tires, and particularly to construct the wheel so as to facilitate access to the bolts that secure the inboard tire in place.

One of the objects of this invention is to provide a construction for a wheel of this type which will facilitate the circulation of air into the space between the tires and into the space surrounding the brake drum, which is usually cut off by the disc of the wheel.

A further object of the invention is to improve the general construction of wheels of this type by increasing their strength particularly at the rim between the felloes.

Further objects of the invention will appear hereinafter.

The invention consists in the novel parts and combination of parts to be described hereinafter, all of which contribute to produce an efficient truck wheel.

A preferred embodiment of the invention is described in the following specification, while the broad scope of the invention is pointed out in the appended claims.

Figures 1, 2, 3:
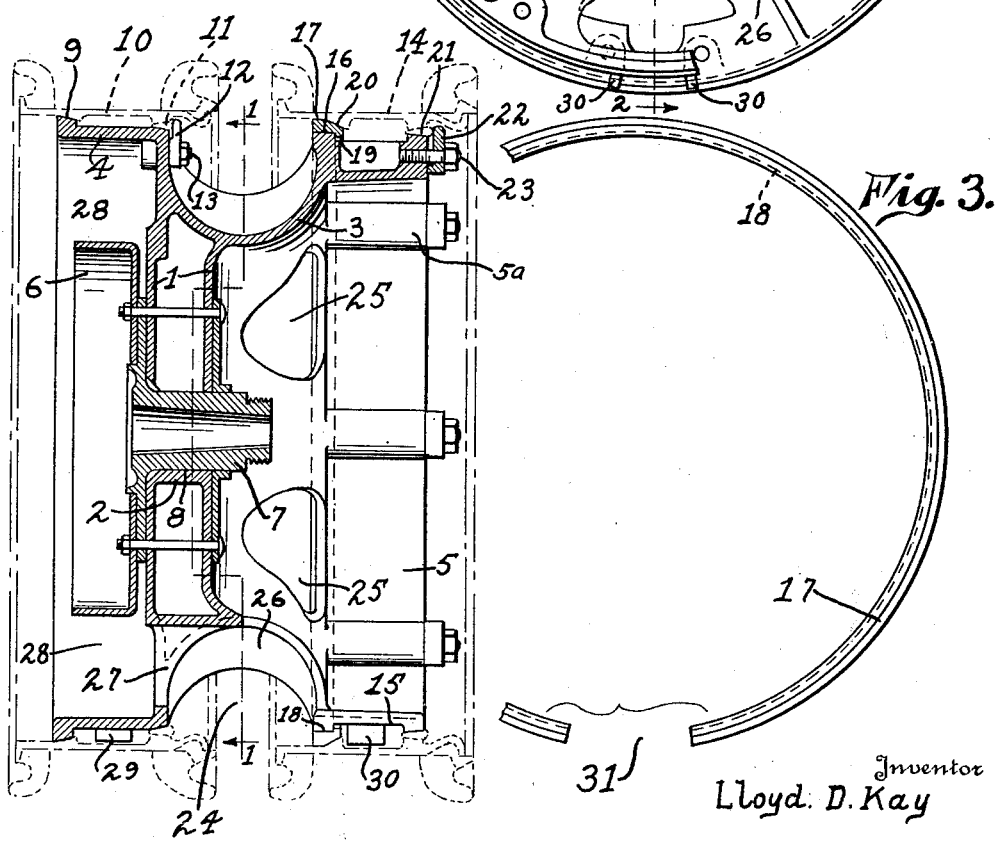
Figure 1 is a side elevation and partial section on the line 1—1 of Fig. 2.
Figure 2 is a section taken on the line 2—2 of Fig. 1.
Figure 3 is a side elevation of the tire rim-seat removed from the wheel, with the left portion of the seat broken away.

In practicing the invention, I construct the hub portion of the wheel of two discs or webs 1 which are disposed apart and connected at the nave of the wheel by a plurality of circumferentially disposed webs or posts 2 (see Fig. 1). These webs 1 at their outer edges connect integrally with an arch-shaped portion or arch 3 of the wheel, which is disposed with its concave side outwardly. At each side or edge of the arch 3, the felloes of the wheel are carried, and these are formed integrally with the arch. In the illustration, 4 indicates the inboard felloe and 5 indicates the outboard felloe. On the inner face of the hub portion of the wheel, a brake drum 6 may be attached. In the present wheel, I illustrate a separate hub 7 which is secured in the central opening or bore 8 of the wheel.

On the inboard edge of the inboard felloe 4, I provide an inclined rim-seat 9 in the usual manner, to receive the inboard tire-rim 10 which is indicated in dotted outline. This tire-rim may be held in place by means of the usual wedge ring 11, backed up by clamps or clips 12 received on studs 13.

In order to provide a seat for the outboard tire-rim 14, indicated in dotted outline, I construct the outboard felloe with a substantially cylindrical outer face 15, and at the inboard end of this felloe I provide an outwardly projecting circumferential edge 16. On this edge I provide a rim-seat 17 which is in the form of a ring (see Fig. 3). This ring has a cylindrical inner face 18 to be received over the cylindrical edge 16, and in addition to this, it has on its outboard edge an inwardly projecting narrow flange 19. This flange cooperates with the face 18 to form an angle and shoulder to receive the projecting edge. This flange operates to impart inboard thrust of the tire-rim to the projecting edge 16.

On its outer side, the rim-seat 17 is provided with an inclined seat face 20 which receives the corresponding seat face on the outboard tire-rim 14. The inner edge of the flange 19 is located at a point out of contact with the cylindrical face 15 of the outboard felloe. The rim-seat 17 is put in place by slipping it over the outboard felloe 5. By reason of the fact that the inner edge of the flange 19 is removed from the outer face of the felloe, the rim-seat 17 can be slipped into position without this flange scraping along the face of the felloe, and hence, this seat can be put in place without gathering grit, which would prevent it from seating properly on the projecting edge 16.

After the outboard tire-rim 14 has been put in place in this way, it is secured with the usual wedge ring 21 at its outer edge held in place by clamps or clips 22 received on studs 23 in the usual manner.

In order to provide for circulation of air into the space 24 between the tires carried on the tire-rims 10 and 14, I provide the arch portion 3 of the wheel with a plurality of large openings 25. In the present wheel I have shown six of these openings. They are relatively large so as to insure an ample circulation of air through them. In order to increase the strength of the wheel and also to provide for forcing this air outwardly, I provide the outer or concave side of the arch 3 with a plurality of webs 26 which virtually constitute the spokes of this wheel. These webs are preferably disposed substantially in planes radiating from the axis of the wheel. They are of course cast integrally with the wheel.

The studs 13 for the inboard tire rim are located substantially midway between the studs 23 for the inboard tire rim (measuring circumferentially) and this brings the studs 13 opposite the openings 25, so that the nuts of these bolts are accessible to a wrench inserted through the openings.

These openings 25 not only pass through the outer wall of the arch 3 but they also pass through the inner wall, as indicated at the point 27 at the lower edge of Fig. 2. In this way, I provide an ample circulation of air into the space 28 surrounding the brake drum 6. This is very effective in preventing overheating of the brake drums. The webs 26 operate as blades when the wheel is in use to force the air outwardly between the felloes, and this tends to produce an air current at the outer side of the wheel moving substantially parallel with the axis of the wheel. This air current of course will have the effect of passing a considerable quantity of air through the inboard side of the arch 3 so as to pass around the brake drum.

As shown most clearly in Figure 2, I provide the outboard felloe 5 with integral bosses or posts 5ª which extend out from the arch 3 to the outer edge of this felloe, and on these bosses the studs 23 are secured. The outer faces of these bosses form seats for the lugs 22 flush with the outboard edge of the felloe, which is desirable, and furthermore, they act as reinforcements for the felloe.

It will be noted that by reason of the laterally displaced position of the arch 3 as illustrated in the drawings, the plane of the center line of the arch is displaced in an outboard direction out of line with the webs 1 of the wheel.

In order to prevent the tire rims from creeping or working around on the felloes, the outer faces of the felloes are provided with one or more lugs. In the illustration, a lug or lugs 29 may be provided on the inboard felloe (see Fig. 2), and a similar lug or lugs 30 may be provided on the outboard felloe. The lugs 30 would of course interfere with the passing of the tire rim-seat 17 over the felloe as suggested, but in order to avoid this, I form this rim-seat or ring 17 as a split ring. In the present instance, there may be two of the lugs 30 disposed at a slight distance apart on the face of the felloe, in which case I provide the rim-seat with a gap 31 of considerable width, sufficient to clear the lugs 30 when the rim-seat is put in place.

The rim-seat 17 and the co-ordinated construction of the wheel as covered by claims 1 to 3 of my application as filed, is my invention, and I reserve the right, and intend to file a separate application for patent covering the same.

What I claim is:—

1. A truck wheel to carry dual tires, having a hub portion with two webs disposed apart with an arch integrally connecting the said webs, and having a felloe projecting laterally from each side of the arch, said arch-shaped portion having its concave side disposed outwardly with transverse webs extending across the arch on its concave side, and disposed substantially in planes radiating from the axis of the wheel, said arch-shaped portion having a plurality of openings therethrough to admit air into the space between the felloes, said last-named webs operating to force the air outwardly between the felloes when the wheel is in use.

2. A truck wheel to carry dual tires, having a hub portion with two webs disposed apart, an arch-shaped outer portion connected integrally to the said webs and having a felloe-projecting laterally from each side of the arch-shaped portion, said arch-shaped portion having its concave side disposed outwardly with transverse integral webs extending across the concave side of the arch-shaped portion, a brake-drum attached to the inner face of the hub-portion, said arch-shaped portion having a plurality of openings therethrough on its outboard side to admit air into the space between the felloes and into the space surrounding the brake drum, said transverse webs operating to force the air outwardly between the felloes when the wheel is in use, and to develop an air current through the wheel into the space surrounding the brake-drum.

Signed at Los Angeles, California, this 6th day of August, 1926.

LLOYD D. KAY.